United States Patent
Yang et al.

(10) Patent No.: US 9,008,641 B2
(45) Date of Patent: Apr. 14, 2015

(54) DETECTING A USER-TO-WIRELESS DEVICE ASSOCIATION IN A VEHICLE

(71) Applicants: Lei Yang, Hillsboro, OR (US); Vijay Sarathi Kesavan, Hillsboro, OR (US); Xue Yang, Arcadia, CA (US)

(72) Inventors: Lei Yang, Hillsboro, OR (US); Vijay Sarathi Kesavan, Hillsboro, OR (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 13/727,851

(22) Filed: Dec. 27, 2012

(65) Prior Publication Data

US 2014/0187219 A1    Jul. 3, 2014

(51) Int. Cl.
*H04M 3/00* (2006.01)
*H04W 4/04* (2009.01)

(52) U.S. Cl.
CPC ..................................... *H04W 4/046* (2013.01)

(58) Field of Classification Search
CPC ..... H04W 4/008; H04W 4/046; H04W 12/08; H04W 8/18; H04L 67/12; H04M 1/72577; A61F 4/00
USPC ............. 455/418, 414.1, 414.2, 422.1, 456.1, 455/425.2, 404.1, 405, 415, 422, 456
See application file for complete search history.

(56) References Cited

U.S. PATENT DOCUMENTS

| | | | |
|---|---|---|---|
| 5,724,024 A | 3/1998 | Sonderegger et al. | |
| 6,906,612 B2 * | 6/2005 | Ghabra et al. | 340/5.61 |
| 7,164,117 B2 * | 1/2007 | Breed et al. | 250/221 |
| 7,243,945 B2 * | 7/2007 | Breed et al. | 280/735 |
| 7,407,029 B2 * | 8/2008 | Breed et al. | 180/274 |
| 8,306,746 B2 * | 11/2012 | Nortrup | 701/465 |
| 8,478,482 B2 * | 7/2013 | Tan | 701/36 |
| 8,606,492 B1 * | 12/2013 | Botnen | 701/123 |
| 2003/0209893 A1 * | 11/2003 | Breed et al. | 280/735 |
| 2004/0129478 A1 * | 7/2004 | Breed et al. | 180/273 |
| 2005/0017488 A1 * | 1/2005 | Breed et al. | 280/735 |
| 2006/0208169 A1 * | 9/2006 | Breed et al. | 250/221 |
| 2007/0182532 A1 | 8/2007 | Lengning et al. | |
| 2007/0238491 A1 | 10/2007 | He | |
| 2012/0040650 A1 * | 2/2012 | Rosen | 455/414.1 |
| 2012/0214463 A1 | 8/2012 | Smith et al. | |
| 2012/0214471 A1 * | 8/2012 | Tadayon et al. | 455/418 |
| 2012/0244877 A1 * | 9/2012 | Margalef et al. | 455/456.1 |
| 2013/0144462 A1 * | 6/2013 | Ricci | 701/1 |
| 2013/0151031 A1 * | 6/2013 | Ricci | 701/1 |
| 2013/0166097 A1 * | 6/2013 | Ricci | 701/1 |
| 2013/0231800 A1 * | 9/2013 | Ricci | 701/1 |

OTHER PUBLICATIONS

International Search Report and Written Opinion Received for PCT Patent Application No. PCT/US2013/048227, Mailed on Aug. 8, 2013, 13 pages.

* cited by examiner

*Primary Examiner* — Joseph Arevalo
(74) *Attorney, Agent, or Firm* — Sutherland Asbill & Brennan LLP

(57) ABSTRACT

A location of a wireless device relative to a vehicle is determined using received data. Data may be received from the vehicle sensors. Data may also be received from the wireless device sensors of a wireless device. The presence of one or more persons may be determined using received data. A user-to-wireless device association may be detected based, at least in part, upon the presence of one or more persons in the vehicle and the location of the wireless device relative to the vehicle.

19 Claims, 4 Drawing Sheets

DETECTING A USER-TO-WIRELESS DEVICE ASSOCIATION IN A VEHICLE

TECHNICAL FIELD

Embodiments of this disclosure relate generally to wireless devices, and more particularly, to user-to-wireless device association in vehicles.

BACKGROUND

The prolific nature of wireless devices permits users to make calls, surf the Internet, or send SMS messages without being tied to a particular location. People may operate such wireless devices, such as smartphones, while driving a vehicle. However, the use of wireless devices while driving increases the chances of being involved in an automobile accident, which may result in serious injury or even death. People who operate wireless devices while driving are often distracted by the wireless device and/or are not concentrating on the task of driving the vehicle. Even with the use of hands-free devices, studies have indicated the risk of an accident related to inattentiveness caused by the user of the wireless device is not completely eliminated.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
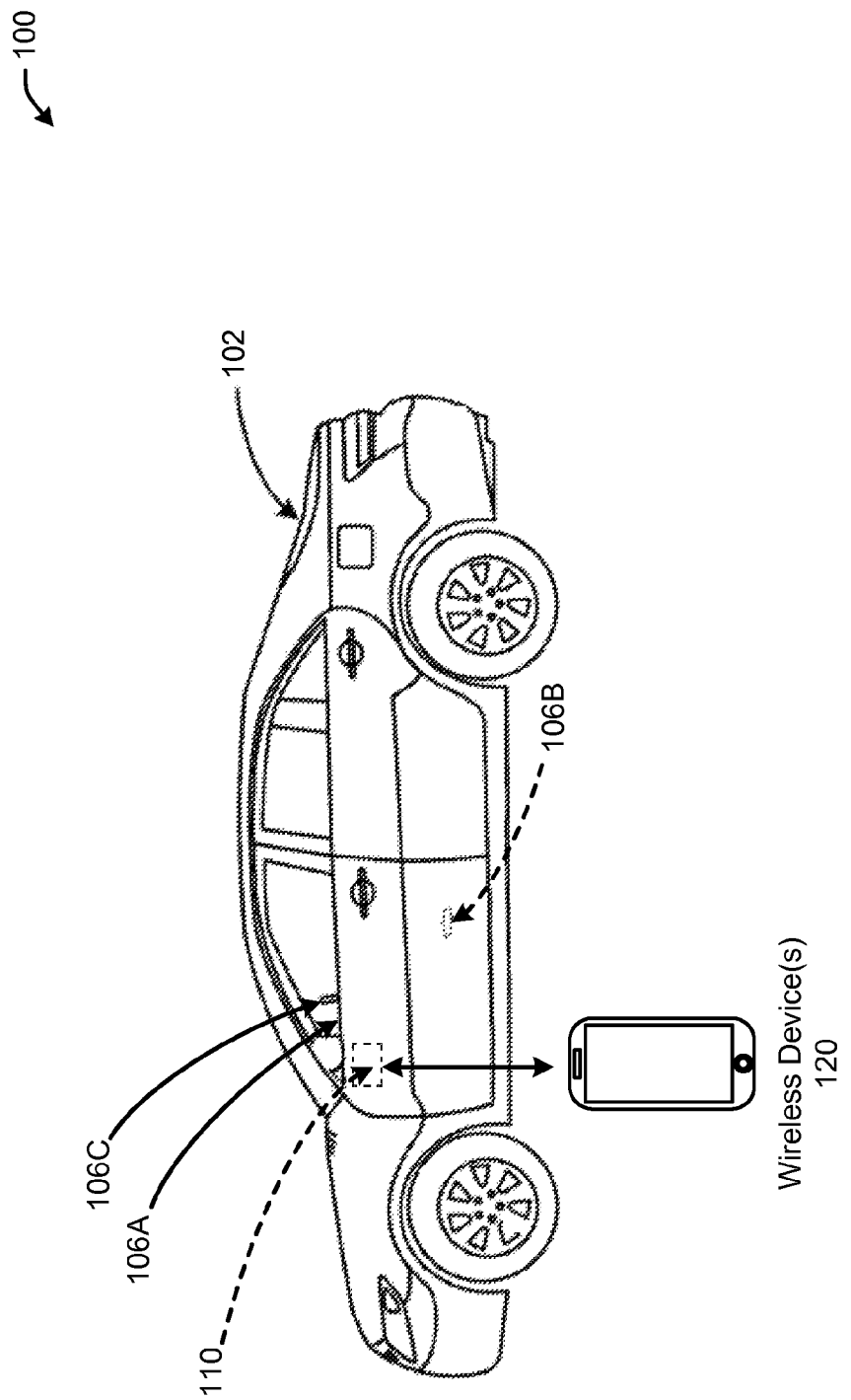
FIG. 1 is a diagram of a configuration for detecting a user-to-wireless device association in vehicles, in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments of the disclosure are described more fully hereinafter with reference to the accompanying drawings in which embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments herein may be directed to communication between a vehicle and a wireless device. A vehicle may include one or more processors, networking interfaces, and other computing devices that may enable it to communicate with a wireless device, such as a smartphone or tablet, over a network. Data may be received from vehicle sensors and/or wireless device sensors to determine whether a driver of the vehicle is using the wireless device. In some embodiments, the presence and identity of people in the vehicle are determined. The relative location of the wireless device with respect to the vehicle may also be determined. A user-to-wireless device association may be determined based upon, at least in part, the presence and identity of people in the vehicle and/or the relative location of the wireless device with respect to the vehicle. In some embodiments, once it has been determined that the driver of the vehicle is using the wireless device, features of the wireless device may be disabled (e.g., texting capabilities are disabled) or modified (e.g., presenting a driving friendly user interface).

This disclosure is directed to a hybrid approach to detecting cell phone usage by a driver of a vehicle. This is done by detecting the relative location of the cell phone in a vehicle as well as the presence and identity of the occupants of the vehicle. A user-to-phone association may be detected, based upon, at least in part, the relative location of the cell phone in the vehicle and/or the presence and identity of the occupants of the vehicle. The relative location of the cell phone and/or the presence and identity of the occupants of the vehicle may be determined using wireless/audio proximity sensing techniques and computer-vision-based phone-to-user matching algorithms to detect usage of a cell phone by a driver of the vehicle.

For example, images may be captured by one or more cameras associated with a wireless device (e.g., front-facing camera). The images may be used to determine the location of the wireless device with respect to the vehicle by processing and analyzing images received from the wireless device. Images may also be received from the vehicle (e.g., vehicular-mounted camera or dashboard camera). The images received from the vehicle may be used to determine the presence of one or more occupants of the vehicle and the identity of the driver of the vehicle. By correlating the images received from the wireless device and the vehicle, it may be determined that the current user of the wireless device is also the current driver of the vehicle. In some embodiments, responsive to the determination that the user of the wireless device is the driver of the vehicle, features of the wireless device may be enabled (e.g., text-to-speech functionality), modified (e.g., larger font size), and/or disabled (e.g., SMS messaging functionality may be disabled).

By combining multiple complementary techniques to identify user-to-phone associations, the systems and methods described herein may provide a more reliable detection of usage of a cell phone by a driver of the vehicle while the vehicle is in motion. Multiple techniques may be employed to determine a user-to-phone association, wherein each technique may be assigned a particular confidence level. Based upon the various confidence levels assigned to the multiple techniques, the systems and methods described herein may make a more consistent determination of whether a driver is using a cell phone while driving the vehicle. For example, Wi-Fi or Bluetooth signal strength may be used to determine the relative location of the cell phone within the cabin of the vehicle. Additionally, an acoustic time of flight technique may also be used to determine the relative location of the cell phone within the cabin of the vehicle. By using the results of multiple techniques, the systems and methods described herein may make a more reliable and robust determination of whether the driver of the vehicle is using a phone while driving the vehicle.

FIG. 1 illustrates an example system configuration 100, in accordance with an embodiment of the disclosure, for detecting a user-to-wireless device association in vehicles. The configuration may include, but is not limited to, one or more vehicles 102. The vehicle 102 may include one or more systems that include one or more processing devices for implementing the functions and features associated with the vehicle 102, as will be discussed in greater detail below. The vehicle 102 may include one or more vehicle sensors 106A-106C (collectively referred to as 106) capable of capturing data associated with the vehicle 102. For example, a microphone 106A may capture audio of one or more occupants of the vehicle. A seat weight sensor 106B may capture the presence of one or more occupants of the vehicle 102 by determining a person is sitting in a particular seat of the vehicle 102. A camera 106C of the vehicle 102 may capture one or more images of the driver of the vehicle 102.

The vehicle 102 may include a vehicle on-board platform, such as an in-vehicle infotainment (IVI) system 110. As used herein, an IVI system 110 may refer to a system in a vehicle 102 that provides entertainment and informational features for the vehicle 102. The IVI system 110 may be part of the vehicle's main computer or a stand-alone system. The IVI system 110 may communicate with a system for detecting a user-to-wireless device association, as described herein. The IVI system 110 may further include one or more processors communicatively coupled to an electronic memory, described in greater detail below.

The IVI system 110 may also be configured to be coupled to a wireless device 120. The wireless device 120 may include one or more wireless device processors communicatively coupled to a wireless device memory, as well as a user interface and an output element, such as a speaker of the vehicle 102. The wireless device 120 may communicate with the vehicle 102 via a communicative link. In certain embodiments herein, devices related to the implementation of user-to-wireless device association may exist onboard an IVI system 110 such that the functionality described herein may be associated with the IVI system 110. In other embodiments, the functionality described herein may reside independently of other systems or may be associated with various other systems.

The IVI system 110 may be in communication with one or more wireless devices 120. In one aspect, a wireless device 120 may serve as an extension of the IVI system 110. For example, if the IVI system 110 does not have Internet capabilities, the IVI system 110 may communicate with a wireless device 120 associated with the vehicle 102 to utilize the communication capabilities of the wireless device 102.

The communicative link may be any suitable electronic communication link including, but not limited to, a hardwired connection, a serial link, a parallel link, a wireless link, a Bluetooth® channel, a ZigBee® connection, a wireless fidelity (Wi-Fi) connection, a Near Field Communication (NFC) protocol, a proprietary protocol connection, or combinations thereof. In one aspect, the communicative link may be secure such that it is relatively difficult to intercept and decipher communications between the wireless device 120 and the IVI system 110. In certain embodiments, the communicative link may be encrypted. Further, in certain embodiments, the communications may be encrypted at more than one open systems interconnection (OSI) model layer. For example, the communications between the wireless device 120 and the vehicle 102 may be encrypted at both the application layer and the transport layer. In some embodiments, the communicative link may be through the communication capabilities of a wireless device 120 associated with the vehicle 102. For example, if the vehicle 102 does not have Internet capabilities, the WI system 110 may be able to access data through its association with, for example, a smartphone with cellular communication capabilities.

It will be appreciated that the wireless device 120 in communication with the IVI system 110 may provide information or entertainment to occupants within the vehicle 102. Further, the wireless device 120 may be removed from the vehicle 102. As an example, a particular wireless device 120 may be used by a user for their own personal computing or entertainment needs outside of the vehicle 102. The same wireless device 120, when brought into the vehicle 102, may serve the purpose of providing an interface for the IVI system 110 of the vehicle 102, wherein the IVI system 110 and the wireless device 120 have been paired. In such a situation, the wireless device 120 may have all of the functions of a similar wireless device 120 that has not been paired to the IVI system 110. At the same time, the paired wireless device 120 may provide an interface for the IVI system 110 without diminishing the stability of the IVI system 110. In certain aspects, the paired wireless device 120 may have access to more information related to the vehicle 102 than a wireless device 120 that is not paired to the IVI system 110.

In some embodiments, pairing the IVI system 110 and the wireless device 120 may include establishing a connection between the IVI system 110 and the wireless device 120 and authenticating or authorizing the wireless device 120. Authenticating or authorizing the wireless device 120 may include using a security token, a security certificate, a user name and password, an electronic passcode, pairing, bonding, sharing a secret, or other security measure to establish a secure connection between the IVI system 110 and the wireless device 120. Once authenticated, the wireless device 120 may be considered a trusted source of data for the IVI system 110. In some embodiments, the IVI system 110 may be considered a trusted source of data for the wireless device 120.

For the purposes of this discussion, the vehicle 102 may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, a motorcycle, or any other suitable vehicle with information and media capability. However, it will be appreciated that embodiments of the disclosure may also be utilized in other transportation or non-transportation related applications where electronically securing one device to another device may be implemented.

For the purposes of this discussion, the wireless device 120 may include, but is not limited to, a tablet computer, a notebook computer, a netbook computer, a personal digital assistant (PDA), a cellular telephone, a smartphone, a digital reader, or any other suitable wireless device with communicative, processing, and storage capabilities. In one aspect, the wireless device 120 may be a portable or mobile wireless device.

Vehicle sensors 106 may be any suitable data gathering element associated with the vehicle 102. As a result, vehicle sensors 106 may gather audio, visual, tactile, or environmental information within or associated with the vehicle 102. For example, the seat weight sensors 106B may gather data that may be processed to determine the location of occupants in the vehicle 102. In some embodiments, the vehicle sensors 106 may include one or more cameras 106C within the cabin and/or outside of the vehicle 102 that may capture images of occupants which may be used to determine the location of the occupants as well as the identity of the occupants. As another example, the vehicle sensors 106 may include a GPS device, an accelerometer, or the like that may indicate whether the vehicle 102 is in motion. The vehicle sensors 106 may communicate with the IVI system 110 to capture information associated with the one or more occupants of the vehicle 102.

Figure 2:
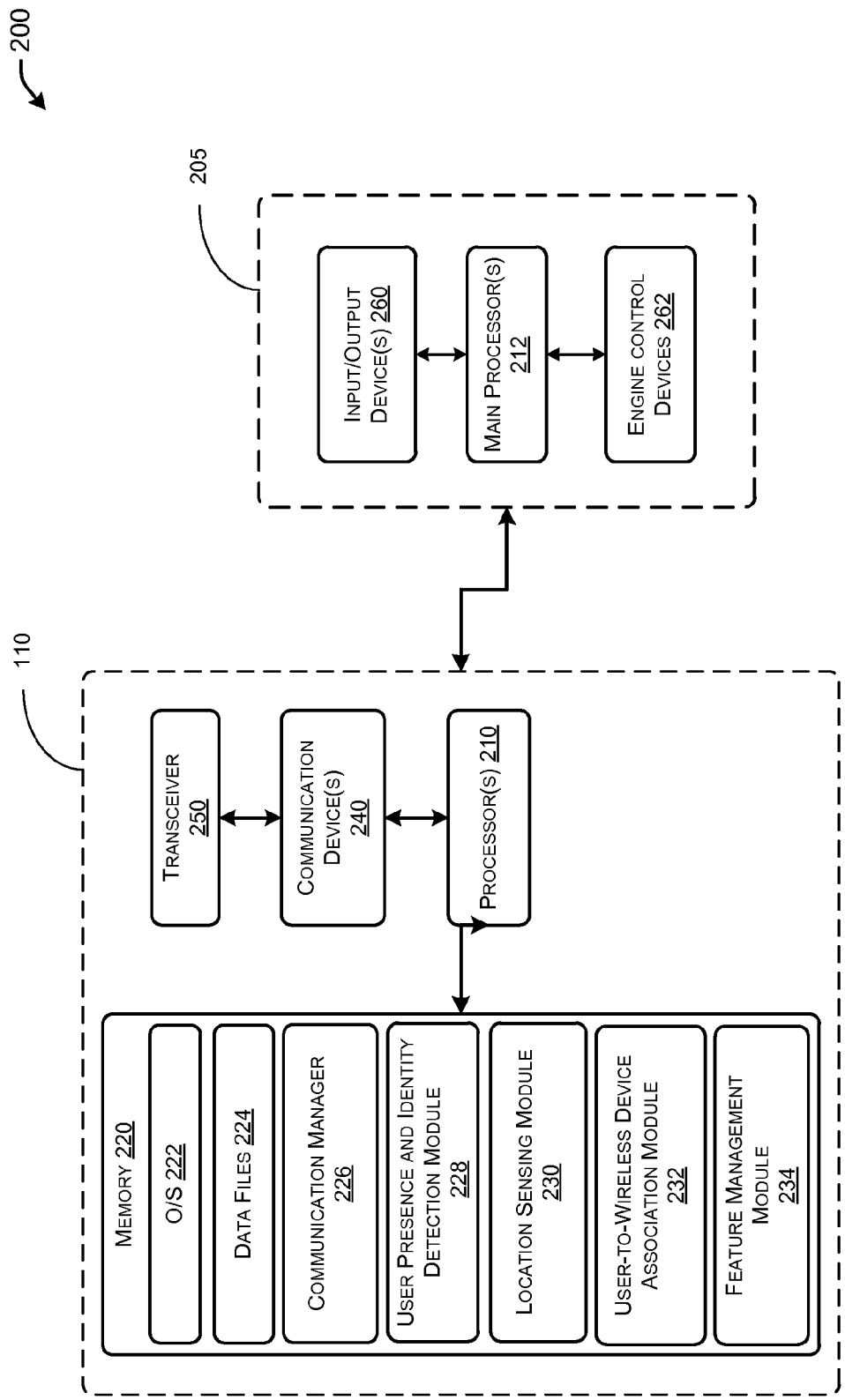
FIG. 2 is a block diagram of an example user-to-wireless device association system, in accordance with an embodiment of the disclosure.

FIG. 2 is a block diagram of an example user-to-wireless device association system, in accordance with an embodiment of the disclosure. As shown in FIG. 2, multiple vehicle systems may exist. For example, a computing system 205 may exist for controlling a vehicle's standard devices or components, which may include engine devices, braking devices, power steering devices, door control devices, window control devices, etc., in one embodiment. The computing system 205 may also include various input/output (I/O) devices 260 that may exist in a vehicle, such as image sensors or collection devices (e.g., a microphone 106A, seat weight sensors 106B, camera 106C) and display devices, such as light-emitting diode (LED) displays and organic light-emitting diode (OLED) displays, as non-limiting examples. A main processor 212 may communicate with the standard engine control devices 262 and I/O devices 260 to activate the devices, send information to these devices, or collect information from these devices, as non-limiting examples.

The computing system 205 may be in communication with the IVI system 110. As used herein, an IVI system 110 may refer to a system in a vehicle 102 that provides entertainment and informational features for the vehicle.

The IVI system 110 may include, but is not limited to, a processor 210, a memory 220, one or more communication devices 240, and a transceiver 250. The processor 210 may communicate with the communication devices 240 in the IVI system 110. For example, the processor 210 may communicate with the memory 220 to execute certain computer-executable instructions or modules, such as 226, 228, 230, 232, 234, stored in the memory 220 to facilitate the detection of user-to-wireless device associations as described herein. In one embodiment, the processor 210 may also communicate with the one or more communication devices 240 to send and receive messages from various types of networks, such as those listed above. A transceiver 250 may facilitate sending and receiving such messages. In some embodiments, a transmitter and a separate receiver may be utilized to send and receive messages, respectively.

According to certain embodiments herein, the processor 210, the memory 220, the communication devices 240, and the transceiver 250 may be onboard the IVI system 110. In this way, these devices may operate out of band, or with access to only minimal power, such as in association with a vehicle shutdown, hibernation, or standby, as non-limiting examples. In one example, a backup battery may be used to provide sufficient power to enable the devices in the IVI system 110 to operate out of band. Thus, the devices in the IVI system 110 may remain awake (e.g., after a vehicle has been shut down) and may provide certain functionality, such as communicating with a user device, e.g., the wireless device 120, to send and receive messages in association with detecting user-to-wireless device associations. Such functionality may be referred to herein as out of band or operating out of band. The devices in the IVI system 110 may also communicate with one another while operating out of band. The processor 210, for example, may communicate with the memory 220 to execute computer-executable instructions or modules therein while operating out of band.

The devices and/or program modules in the computing system 205 may shut down when a vehicle 102 is powered down, for example, and therefore may not operate out of band. For example, a main operating system (not shown) that may control standard components in a vehicle, such as an engine, brakes, doors, windows, hard disks, or other devices in communication with the main operating system or one of its program modules, may not be operational when the vehicle 102 is shut down. The operating system (O/S) 222 in the memory 220, however, may be operational when the vehicle 102 is shut down, or otherwise in a low power state such as hibernation or standby, because it may be located onboard or at the board level in firmware, according to certain embodiments herein. Such a configuration may enable devices in the IVI system 110 to send messages, receive messages, and perform the function of detecting user-to-wireless device associations. As an example, according to certain embodiments, the processor 210 of the IVI system 110 may communicate with the main processor 212 (and/or other devices) of the computing system 205 to wake the main processor 212 so that it may cause performance of the functions requested by a user via a wireless device 120. In one embodiment, such communication may occur via the communicative link.

The processors 210 and 212 may include any number of suitable processing devices, such as a central processing unit (CPU), a digital signal processor (DSP), a reduced instruction set computer (RISC), a complex instruction set computer (CISC), a microprocessor, a microcontroller, a field programmable gate array (FPGA), or any combination thereof. In one embodiment, the vehicle computing system 200 may be based on an Intel® Architecture system, and the processors 210 and chipset may be from a family of Intel® processors and chipsets, such as the Intel® Atom® processor family. The processor 210 may also include one or more processors as part of one or more application-specific integrated circuits (ASICs) or application-specific standard products (ASSPs) for handling specific data processing functions or tasks. Additionally, any number of suitable I/O interfaces and/or communications interfaces (e.g., network interfaces, data bus interfaces, etc.) may facilitate communication between the processors 210 and other components of the vehicle computing system 200.

The one or more communication devices 240 may facilitate communications between the vehicle computing system 200 and other devices that may be external to a vehicle 102 containing the vehicle computing system 200. For example, the one or more communication devices 240 may enable the vehicle computing system 200 to receive messages from a wireless device 120 and/or send messages to a wireless device 120 as illustrated in FIG. 1. The communication devices 240 may enable various types of communications over different networks, such as wireless networks including, but not limited to, a wireless fidelity (Wi-Fi) network, a Wi-Fi Direct network, an NFC connection, a radio network, a cellular network, a GPS network, a ZigBee® connection, a Bluetooth® channel, proprietary protocol connections, and other wireless links, as well as hardwired connections, serial link connections, parallel link connections, or combinations thereof.

According to various configurations, one or multiple interface cards or circuits may support the multiple networks named above. In one embodiment, such as one or more interface cards or circuits, may be onboard such that firmware in the memory 220 may access and control communications associated with the customized IVI system 110.

The communication manager module 226 may also send messages using one or more interface cards associated with the various types of networks. As will be described below, the communication manager module 226 may prioritize which channels to use for communicating with a wireless device 120. In addition to onboard interface cards, externally facing devices may also be used to communicate messages over various types of networks.

Turning now to the contents of the memory 220, the memory 220 may include any number of suitable memory devices, such as caches, read-only memory devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, magnetic storage devices, removable storage devices (e.g., memory cards, etc.), and/or non-removable storage devices. As desired, the memory 220 may include internal memory devices and/or external memory devices in communication with the vehicle computing system 200.

The memory 220 may store data, executable instructions, and/or various program modules utilized by the processor 210. Examples of data that may be stored by the memory 220 include data files 224 and any number of suitable program modules and/or applications that may be executed by the processor 210, such as, but not limited to, an operating system (O/S) 222, a communication manager module 226, a user presence and identity detection (UPID) module 228, a location sensing module 230, a user-to-wireless device association module 232, and a feature management module 234. Each of these modules may be implemented as individual modules or, alternatively, one or more of the modules may perform all or at least some of the functionality associated with the other modules. In certain embodiments, these modules may be stored as firmware in a read-only memory 220, thereby making it more difficult for the functions described herein to be tampered with or disabled.

The data files 224 may include any suitable information that may facilitate the detection of user-to-wireless device associations. Example information may include, but is not limited to, information that may be used to associate a wireless device 120 with the IVI system 110, tracking information associated with requests from wireless devices 120 and responses to such requests, as well as other information that may facilitate the processes described herein. Data files 224 may also include information associated with one or more driver profiles, adding a driver profile, and/or data used to determine identity information for one or more occupants of the vehicle 102.

The O/S 222 may include a suitable module or application that facilitates the general operation of the vehicle computing system 200, as well as the execution of other program modules illustrated in the memory 220 in FIG. 2.

The communication manager module 226 may perform a number of functions to facilitate communications between the vehicle computing system 200 and various other devices, such as a wireless device 120 in FIG. 1. As described above, the communication manager module 226 may communicate with one or more communication devices 240, such as network interface cards, to receive and send messages to wireless devices 120 using multiple types of networks. In association with such communication, the communication manager module 226 may determine a network among multiple available networks for communicating with a wireless device 120, may prioritize the networks according to various criteria, and may send messages over a selected network to a vehicle 102, for example.

The user presence and identity detection (UPID) module 228 may perform a number of functions to facilitate determining the presence of occupants in a vehicle 102 and identifying the occupants in the vehicle. For example, UPID module 228 may determine the presence and location of occupants in the vehicle 102 based upon received data (e.g., from vehicle sensors 106 or the wireless device 120). The UPID module 228 may determine the identity of the occupants of the vehicle 102.

The location sensing module 230 may perform a number of functions to facilitate determining the location of a wireless device 120 relative to a vehicle 102. The location sensing module 230 may receive data from one or more vehicle sensors 106 or data from the wireless device 120. The location sensing module 230 may process the received data to determine the physical location of the wireless device 120 relative to the vehicle 102. For example, the location sensing module 230 may process images captured by cameras associated with the vehicle 102 and/or images from the wireless device 120 to determine if the wireless device 120 is located in the front seats or back seats of the vehicle 102 or on the right side or left side of the vehicle.

The user-to-wireless device association module 232 may include various protocols that may be used by devices in the vehicle computing system 200 to determine user-to-wireless device associations. For example, the user-to-wireless device association module 232 may receive information from the location sensing module 230 and the UPID module 228. Based upon the received data, the user-to-wireless device association module 232 may determine an association between an occupant of the vehicle 102 and a wireless device 120. In some embodiments, the user-to-wireless device association module 232 may determine multiple user-to-wireless device associations. In some embodiments, the user-to-wireless device association module 232 may determine that the driver is using the wireless device 120 while the vehicle 102 is in motion, based upon, at least in part, at least one determined user-to-wireless device association. The user-to-wireless device association module 232 may also receive information from other sources, which may include, but are not limited to, vehicle sensors 106, sensors associated with the wireless device 120, one or more remote servers, or data stored in the data files 224 (e.g., data associated with the internal layout of the vehicle 102, such as whether the driver's seat is on the right side or the left side of the vehicle 102, as well as user profiles, or the like) to determine the driver is using the wireless device 120 while the vehicle is in motion.

The feature management module 234 may perform a number of functions associated with feature management in association with the wireless device 120. For example, the feature management module 234 may receive an indication from the user-to-wireless device association module 232 indicating that the driver is using the wireless device 120. Responsive to the indication, the feature management module 234 may enable, modify, or disable features of the wireless device 120. For example, in some embodiments, the feature management module 234 may disable texting, calling, or web browser capabilities in response to a determination that the user utilizing the wireless device 120 is the driver of the moving vehicle 102. In some embodiments, the feature management module 234 may enable features, such as text-to-speech features, to aid the driver without the driver being focused on the wireless device 120. In some embodiments the feature management module 234 may modify executing applications on the wireless device 120 to provide driver-friendly interfaces, such as a larger font size for applications. The feature management module 234 may return features to their normal operating standards when it receives an indication that the driver is no longer using the mobile device (e.g., the mobile device is in the possession of a different occupant of the vehicle 102) or the vehicle has stopped moving.

In addition to or alternative to the memory 220, other embodiments may include one or more suitable computer-readable media that may be provided for storing computer-executable instructions such as those stored in the memory 220. One or more processing devices, such as the processor 210, may execute such computer-executable instructions to facilitate the remote management of a vehicle, as described above in association with the modules 226, 228, 230, 232, 234 in the memory 220. As used herein, the term "computer-readable medium" may describe any form of suitable memory or memory device for retaining information in any form, including various kinds of storage devices (e.g., magnetic, optical, static, etc.) that are non-transitory. Indeed, various embodiments of the disclosure may be implemented in a wide variety of suitable forms.

Figure 3:
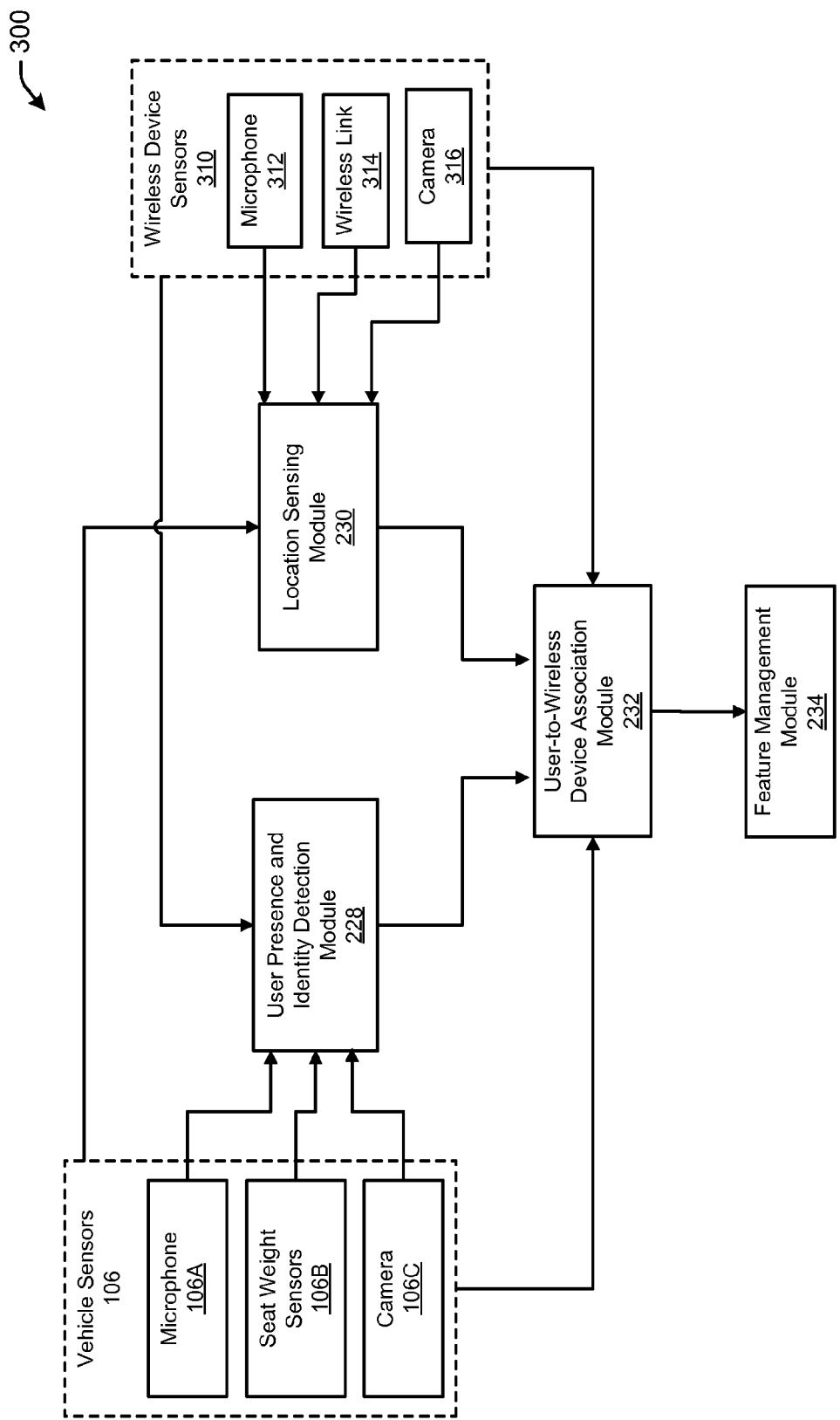
FIG. 3 is a diagram of an example user-to-wireless device association system, in accordance with an embodiment of the disclosure.

FIG. 3 is a diagram of an example user-to-wireless device association system, in accordance with an embodiment of the disclosure. In brief overview, the UPID module 228 and/or the location sensing module 230 may receive data from sensors. Sensors may include, but are not limited to, vehicle sensors (e.g., microphone 106A, seat weight sensors 106B, camera 106C) associated with a vehicle 102 and/or wireless device sensors 310 (e.g., microphone 312, wireless link 314, camera 316) from one or more wireless devices 120. The UPID module 228 may determine the presence and/or identity of one or more occupants of a vehicle 102. The location sensing module 230 may detect a location of one or more wireless devices 120 relative to the vehicle 102. The user-to-wireless device association module 232 may receive data from the UPID module 228 and/or the location sensing module 230. Based upon the received data, the user-to-wireless device association module 232 may determine one or more user-to-wireless device associations. The user-to-wireless device association module 232 may also determine, based upon, at least in part, the one or more determined user-to-wireless device associations, whether a driver of the vehicle 102 is using a wireless device 120 while driving. The feature management module 234 may receive an indication that the driver of the vehicle 102 is using a wireless device 120 while driving from the user-to-wireless device association module 232. Responsive to receiving the indication, the feature management module 234 may enable, modify, or disable features of the wireless device 120.

The UPID module 228 may receive data from one or more vehicle sensors 106 (e.g., microphone 106A, seat weight sensors 106B, camera 106C) or one or more wireless device sensors 310 (e.g., microphone 312, wireless link 314, camera 316). In some embodiments, the presence of an occupant of the vehicle 102 may be determined via seat weight sensors 106B in a seat of a vehicle 102. The identity of the occupant may be determined using information (e.g., images) captured by a camera 106C of the vehicle 102. UPID module 228 may process the received data to determine the identity of the occupant by utilizing facial recognition algorithms. In some embodiments, a direct scene comparison may be used, where images are compared to determine if there is significant overlap to track whether the person using the wireless device 120 (e.g., from images captured from the wireless device) is the same person driving the vehicle 102 (e.g. from images captured from the camera 106C associated with the vehicle 102).

In some embodiments, the process data may be stored in the vehicle 102, in the wireless device 120, and/or in a cloud storage system. In some embodiments, for each of the metrics calculated by the UPID module 228, a confidence level may be computed and associated with each metric. The confidence level may be used by the user-to-wireless device association module 232, described below.

In some embodiments, the UPID module 228 may correlate images taken from the cameras 316 associated with the wireless device sensors 310 and the cameras 106C associated with the vehicle 102 and generate user identify profiles using vision algorithms. For example, since the camera 316 associated with the wireless device 120 usually faces the user when the wireless device 120 is being used, the camera 316 may capture an image, and the UPID module 228 may apply one or more facial recognition algorithms to identify the current user of the wireless device 120. The UPID module 228 may correlate the results of the facial recognition algorithms with the images captured by a camera associated with the vehicle 102 (e.g., vehicular-mounted camera or dashboard camera). The UPID module 228 may use the camera associated with the wireless device 120 to analyze the background scene to determine if the current user of the wireless device 120 is the driver or a passenger of the vehicle 102. In some embodiments, the correlation of images received from one or more cameras may require additional information exchanged between the IVI system 110 and the wireless device 120 and a processor to run the vision algorithm. In some embodiments, a vehicle and wireless device pairing may be established, wherein data from the vehicle sensors 106 may be transmitted to the wireless device 120, and the wireless device 120 may determine the presence and/or identities of the occupants of the vehicle 102.

The location sensing module 230 may receive data from one or more vehicle sensors 106 (e.g., microphone 106A, seat weight sensors 106B, camera 106C) or one or more wireless device sensors 310 (e.g., microphone 312, wireless link 314, camera 316). The location sensing module 230 may use the received data to determine the position of the wireless device 120 relative to the vehicle 102. The physical location of a wireless device 120 may be determined using data received from various sensors associated with the vehicle 102 and/or the wireless device 120. Some examples of data received from various sensors may include, but are not limited to, Wi-Fi signal strength between the vehicle 102 and the wireless device 120, Bluetooth signal strength between the vehicle 102 and the wireless device 120, and acoustic signals.

The location sensing module 230 may determine a proximate location of the wireless device 120 using multiple techniques. For example, the relative location of the wireless device 120 may be determined by measuring the received Wi-Fi or Bluetooth signal strength from the vehicle 102 to wireless device 120. If a Wi-Fi or Bluetooth antenna is installed at the driver's side or seat, relative wireless device to vehicle proximity sensing can be used. The location sensing accuracy may be improved by installing multiple antennas within the vehicle 102. Data received from the multiple antennas may be used by trilateration algorithms to estimate the relative location of the wireless device 120.

The location sensing module 230 may determine the relative location of the wireless device by measuring time-of-flight (ToF) of acoustic signals from the speakers of the vehicle 102 to the wireless device 120. A ToF calculation may measure the amount of time it takes for an acoustic signal to be received and then determine the distance based upon the elapsed time. In some embodiments, the location sensing module 230 may determine the relative location of the wireless device by measuring the time-difference-of-arrival (TDoA) of acoustic signals from the speakers of the vehicle 102 to the wireless device 120. A TDoA calculation may measure the time difference it takes to receive acoustic signals from different locations and then determine the distance based upon the multiple time measurements from the different locations. In some embodiments, the location sensing module 230 may determine a proximate location of the wireless device 120 based upon a ToF calculation of a Wi-Fi packet transmission from a vehicle Wi-Fi transmitter to the wireless device 120. Additionally, Wi-Fi channel fading profiles may be used to decompose different paths to further improve the accuracy of the location measurement. In some embodiments, the location sensing module 230 may determine the proximate location of the wireless device 120 prior to determining the presence and/or identities of the occupants of the vehicle 102. For example, because vision-based algorithms (e.g., facial recognition algorithms) may require more computation and power, the location sensing module 230 may make preliminary determinations and then transmit an indication to the UPID module 228 to make one or more determinations. In some embodiments, for each of the metrics calculated by the location sensing module 230, a confidence level may be computed and associated with each metric. The confidence level may be used by the user-to-wireless device association module 232, described below.

In some embodiments, the confidence levels associated with a metric determined by the UPID module 228 or the location sensing module 230 may be determined based upon different factors. For example, if the UPID module 228 utilizes a technique requiring an image captured from a vehicular-mounted camera or a dashboard camera of a vehicle 102, the confidence level of the metric may be low if the image is captured during night time or the captured image is low quality (e.g., blurry). If the image is captured during the daytime, the confidence level calculated may be high.

The user-to-wireless device association module 232 may receive the metrics determined by the UPID module 228 and/or the location sensing module 230. The user-to-wireless device association module 232 may also receive the confidence levels associated with each metric. The user-to-wireless device association module 232 may determine or identify a user-to-wireless device association based upon, at least in part, the metrics received from the UPID module 228 and/or the location sensing module 230. In some embodiments, the user-to-wireless device association module 232 may determine or identify a user-to-wireless device association based upon, at least in part, the metrics received and the confidence levels associated with each of the metrics. For example, the UPID module 228 may have utilized three techniques to identify the occupants of the vehicle 102, and each of the three techniques may have produced a different metric. Each metric may have a different confidence level associated with it. The user-to-wireless device association module 232 may combine the different metrics, based upon, at least in part, the received metrics and the different confidence levels associated with the metrics.

Figure 4:
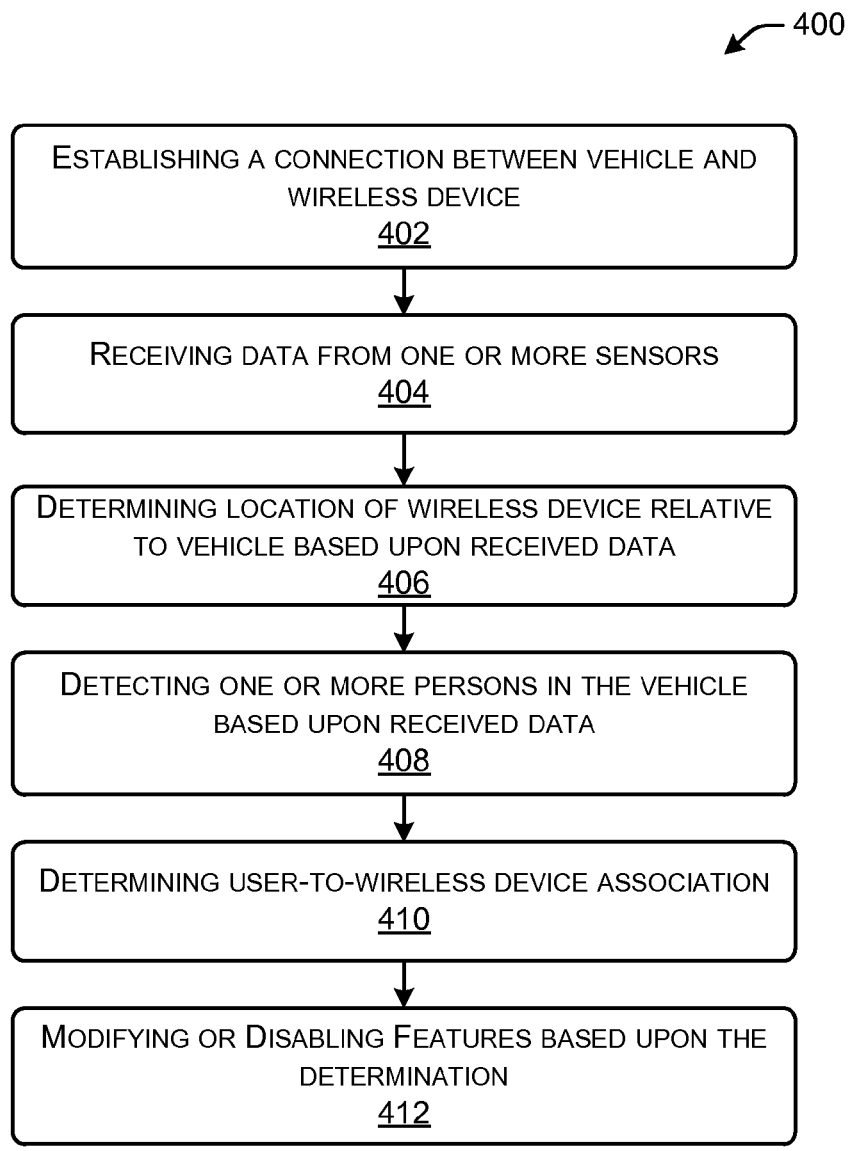
FIG. 4 is a flow diagram of a method for detecting a user-to-wireless device association in vehicles, according to one embodiment of the disclosure.

FIG. 4 illustrates an example flow diagram for detecting a user-to-wireless device association in a vehicle 102, according to one embodiment. In brief overview, at block 402, a connection may be established between a vehicle 102 and a wireless device 120. At block 404, data may be received from one or more sensors (e.g., vehicle sensors 106 and/or wireless device sensors 310). At block 406, a location of the wireless device 120 relative to the vehicle 102 may be determined based upon, at least in part, the received data. At block 408, one or more persons may be detected in the vehicle 102 based upon, at least in part, the received data. At block 410, a user-to-wireless device association may be determined. At block 412, based upon a determination of the usage of the wireless device 120 by the driver of the vehicle 102, one or more features of the wireless device 120 may be modified or disabled.

In some embodiments, at block 402, a connection between a vehicle 102 and a wireless device 120 may be established. In some embodiments of the systems and methods described herein, establishing a connection may not be required or possible. Thus, in some embodiments, this action may be optional or not required. If the wireless device 120 has communication capabilities, the wireless device 120 may establish a connection with the vehicle 102. In some embodiments, the established connection may be a secured connection by using authentication tokens, certificates, pairing, bonding, shared secrets, or the like. In some embodiments, an association or pairing between the vehicle 102 and the wireless device 120 may already exist.

The wireless device 120 may establish a connection or interact with the vehicle 102. The connection may be over a wireless link, such as Bluetooth®, Wi-Fi, Near Field Communication, or other similar technology. In some embodiments, the connection may be a wired link, such as USB. Once a connection is established, the wireless device 120 may be authenticated. After the wireless device 120 has been authenticated, the wireless device 120 and/or the vehicle 102 may save the pairing or association so that the next time the vehicle 102 and the wireless device 120 are in close proximity, the wireless device 120 does not need to be authenticated again. Information may be exchanged between the vehicle 102 and the wireless device 120 over the established connection.

In some embodiments, a secure connection between the vehicle 102 and the wireless device 120 may not be required or possible. The wireless device 120 may determine the user presence and identity of occupants of the vehicle 102, determine the location of the wireless device 120 relative to the vehicle 102, identify a user-to-wireless device association, and manage features based at least in part on the user-to-wireless device associations without a connection or any communication with the vehicle 102.

At block 404, the UPID module 228 and/or the location sensing module 230 may receive data from one or more sensors 106, 310. In some embodiments, the sensors may include vehicle sensors (e.g., microphone 106A, seat weight sensors 106B, camera 106C, or the like) and/or wireless device sensors 310 (e.g., microphone 312, wireless link 314, or cameras 316). As discussed above, UPID module 228 may reside in the vehicle 102, on the wireless device 120, or on a server. The server may be a dedicated server, part of a server farm, or may reside in the cloud. Data may be transmitted over the established connection from the vehicle sensors 106 or the wireless device 120 to the UPID module 228 and/or the location sensing module 230. Data may include images captured by cameras 106C, 316, audio captured by microphones 106A, 312, and information captured by seat weight sensors 106B. In some embodiments, the vehicle 102 may have a vehicle occupant classification system, which may use a combination of weight estimation, pattern recognition, and evaluation of statistical characteristics. Generally, vehicle occupant classification systems may be used to make air bag deployment decisions. The UPID module 228 and/or location sensing module 230 may communicate with a vehicle occupant classification system to obtain data regarding the presence of people in the vehicle 102.

At block 406, the location sensing module 230 may determine a location of a wireless device 120 relative to the vehicle 102 based upon, at least in part, the received data. As discussed above, in some embodiments, the location sensing module 230 may receive data from vehicle sensors 106 and/or wireless device sensors 310 to determine the location of the wireless device 120 relative to the vehicle 102. In some embodiments, the location sensing module 230 may reside in the IVI system 110, on the wireless device 120, or on a remote server. The physical location of the wireless device 120 may be determined based upon, at least in part, data received from different sensors (e.g., Wi-Fi, Bluetooth, and/or acoustic signals with signal strength). In some embodiments, the location sensing module 230 may determine the physical location of the wireless device 120 based upon a time of flight calculation. In some embodiments, the location sensing module 230 may apply scene analysis to images received from wireless device cameras 316 or cameras 106C associated with a vehicle 102. For example, the location sensing module 230 may process images from a wireless device to determine a window location relative to the person in the image. In some embodiments, the location sensing module 230 may process images from a camera 106C associated with a vehicle 102 to determine if the occupant has a headphone or headset in association with the wireless device, whether the wireless device 120 is in the occupant's hand, or the like.

In some embodiments, the wireless device 120 and the vehicle 102 may not have an established connection. The location sensing module 230 may leverage the camera 316 of the wireless device for preliminary detection of the relative location of the wireless device within the vehicle 102. In some embodiments, processing images captured by the wireless device 120 may require some knowledge associated with the vehicle (e.g., in cars found in the United States, the driver's seat may be located on the left side of the vehicle, whereas in the United Kingdom, the driver's seat may be located on the right side of the vehicle). In some embodiments, the location sensing module 230 may utilize facial recognition to detect whether someone is using the wireless device. The location sensing module 230 may also perform background scene analysis based upon the images captured by the camera 316 of the wireless device 120. For example, the location sensing module 230 may determine, based upon common features of vehicles 102 that the individual using the wireless device is in one of the front seats based upon determining that the backseat of the vehicle is visible in the image. The location sensing module 230 may determine that the occupant of the vehicle 102 using the wireless device 120 is located on the right side of the vehicle by analyzing the position of the visible windows of the vehicle 102.

At block 408, the UPID module 228 may detect the presence and/or identity of one or more occupants of the vehicle 102 based upon, at least in part, the received data. In some embodiments, the UPID module 228 may identify an occupant of the vehicle 102 based upon the secured connection between the vehicle 102 and the wireless device 120. For example, if a wireless device 120 is a smartphone belonging to John Smith, the UPID module 228 may initially determine the identity of the occupant using the wireless device 120 to be John Smith. In some embodiments, such a determination may then be confirmed through facial recognition or other means. In some embodiments, the UPID module 228 may determine the identity of a vehicle occupant using facial recognition and/or a vision algorithm on images received from the vehicle sensors 106 and/or the wireless device sensors 310.

At block 410, the user-to-wireless device association module 232 may determine a user-to-wireless device association. In some embodiments, a user-to-wireless device association may be based upon, at least in part, the determination of the location of the wireless device 120 relative to the vehicle 102, the detection and identification of occupants of the vehicle 102, or any combination thereof. In some embodiments, the user-to-wireless device association module 232 may retrieve information associated with the identified occupants of the vehicle 102 to determine a user-to-wireless device association (e.g., occupant profile information, history of the occupants of the vehicle 102, or the like). For example, the user-to-wireless device association module 232 may correlate one or more images received from a camera 106C associated with the vehicle 102 and/or the camera 316 associated with the wireless device 120 to identify the occupant of the vehicle 102 using the wireless device 120. The user-to-wireless device association module 232 may generate a user identity profile of the occupant of the vehicle 102, based upon, at least in part, the correlated images. The user-to-wireless device association module 232 may associate the wireless device 120 to the occupant identified in the correlated images.

In some embodiments, the user-to-wireless device association module 232 may identify multiple user-to-wireless device associations. The user-to-wireless device association module 232 may determine a user-to-wireless device association for just the driver of the vehicle 102. In some embodiments, the user-to-wireless device association module 232 may determine user-to-wireless device associations for all wireless devices within the vehicle 102. In some embodiments, the user-to-wireless device association module 232 may determine user-to-wireless device associations for wireless devices 120 paired with the vehicle 102.

In some embodiments, the user-to-wireless device association module 232 may determine a user-to-wireless device association based upon, at least in part, at least one of the locations of the wireless device 120 relative to the vehicle 102 and the presence and/or identity of the one or more occupants of the vehicle 102. In some embodiments, the user-to-wireless device association module 232 may determine the usage of the wireless device 120 by the driver of the vehicle 102 based upon the user-to-wireless device association.

At block 412, the feature management module 234 may modify and/or disable features based upon, at least in part, the detected usage of the wireless device 120 by the driver of the vehicle 102. In some embodiments, the feature management module 234 may receive an indication from the user-to-wireless device association module 232 that the driver of the vehicle 102 is utilizing a wireless device 120 while driving. Responsive to receiving the indication, the feature management module 234 may disable one or more features of the wireless device 120. For example, upon detecting that the wireless device 120 is being used by the driver of the vehicle 102 while driving, the feature management module 234 may disable features such as, but not limited to, texting, browsing the Internet, making a phone call, receiving a phone call, playing a game on the wireless device 120, or the like. In some embodiments, the feature management module 234 may enable one or more driver-friendly features, such as a larger font size to enable the driver to read the wireless device without too much effort, enabling step-by-step pictorial driving directions (e.g., use of windows and estimates of distance), or text-to-speech features (e.g., providing audible driving directions). The feature management module 234 may enable, modify, or disable features of the application executing at the time of the detection. In some embodiments, the feature management module 234 may enable, modify, or disable features of some or all applications associated with the wireless device 120. In some embodiments, the feature management module 234 may enable, modify, or disable features of applications that are executing at the time of the detection. In some embodiments, the user may configure the settings associated with the feature management module 234 to enable and disable features. In some embodiments, the settings associated with the feature management module 234 may be set at time of manufacture. In some embodiments, the settings may be configured by an administrator associated with the vehicle 102 and/or the wireless device 120.

In some embodiments, the systems and methods described herein may adapt to the scenarios when one or more of the techniques utilized to determine a user-to-wireless device association fail. In order to accommodate such scenarios, the systems and methods described herein may utilize sequential processing. In some embodiments, there may be a natural priority among the different techniques. For example, although vision techniques, such as processing of images captured by cameras 106C, 316, may be precise during the day, such techniques may not be very reliable in dark settings. In such scenarios, other techniques that are audio-based, such as time of flight calculations, may be given a great weight (e.g., higher confidence levels) when determining the user-to-wireless device associations. Another example may be that though vision techniques may be more accurate than other techniques, capturing the images may require higher power consumption by the wireless device 120, which may have limited power. In such scenarios, other techniques, such as audio-based techniques, may be utilized to determine user-to-wireless device associations.

In some embodiments, the location detecting techniques may be utilized for preliminary detection of wireless devices 120. Based upon the detection of the number of wireless devices 120, fewer techniques may be utilized to determine the identity of occupants of the vehicle 102.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
  receiving, by one or more processors, data from one or more vehicle sensors of a vehicle;
  receiving, by the one or more processors, data from one or more wireless device sensors of a wireless device;
  determining, by the one or more processors, a location of the wireless device relative to the vehicle using at least one of the data received from the one or more vehicle sensors and the data received from the one or more wireless device sensors;
  determining, by the one or more processors, a presence of one or more persons in the vehicle using at least one of the data received from the one or more vehicle sensors and the data received from the one or more wireless device sensors; and
  detecting, by the one or more processors, a user-to-wireless device association between a driver of the vehicle and the wireless device using the location of the wireless device and the presence of the one or more persons in the vehicle,
  wherein the one or more vehicle sensors comprise at least one of a seat weight sensor, a microphone, and a vehicular-mounted camera, wherein determining the presence of the one or more persons further comprises determining an identity of the driver using one or more images captured by the camera, audio captured by the microphone, or information captured by the seat weight sensor.

2. The computer-implemented method of claim 1, wherein determining the location of the wireless device further comprises using at least one of Wi-Fi data, Bluetooth data, acoustic signals with signal strength, time-of-flight calculations, or time-difference-of-arrival calculations.

3. The computer-implemented method of claim 1, wherein detecting the user-to-wireless device association further comprises:
    correlating images taken from at least one of a vehicular-mounted camera and a camera of the wireless device.

4. The computer-implemented method of claim 3, further comprising
    generating a user identity profile of the driver based, at least in part, upon the correlated images; and
    associating the wireless device and the driver.

5. The computer-implemented method of claim 1, further comprising, responsive to detecting the user-to-wireless device association, either disabling one or more features of the wireless device or enabling a driver-friendly interface on the wireless device.

6. The computer-implemented method of claim 1, wherein determining the location of the wireless device further comprises applying scene analysis to one or more images received from the one or more wireless device sensors.

7. A computer program product residing on a non-transitory computer-readable medium having a plurality of instructions stored thereon which, when executed by a processor, cause the processor to perform operations comprising:
    receiving data from one or more vehicle sensors of a vehicle, wherein the one or more vehicle sensors comprise at least one of a seat weight sensor, a microphone, and a vehicular-mounted camera;
    receiving data from one or more wireless device sensors of a wireless device;
    identifying a location of the wireless device relative to the vehicle;
    determining a presence of one or more persons in the vehicle, wherein determining the presence of the one or more persons further comprises determining an identity of the driver using one or more images captured by the camera, audio captured by the microphone, or information captured by the seat weight sensor; and
    determining, by the one or more processors, a user-to-wireless device association between the wireless device and a driver of the vehicle using the identified location of the wireless device and the identified presence of the one or more persons in the vehicle.

8. The computer program product of claim 7, wherein identifying the location of the wireless device further comprises using one or more of Wi-Fi signal strength, Bluetooth signal strength, acoustic signals with signal strength, acoustic time-of-flight calculations, acoustic time-difference-of-arrival calculations, Wi-Fi time-of-flight calculations, or Wi-Fi time-difference-of-arrival calculations.

9. The computer program product of claim 7, wherein identifying the location of the wireless device further comprises utilizing scene analysis on one or more images received from the wireless device.

10. The computer program product of claim 7, wherein identifying the presence of the one or more persons in the vehicle further comprises identifying the presence of the driver of the vehicle using one or more vision algorithms.

11. The computer program product of claim 7, further comprising disabling one or more features of the wireless device responsive to determining the user-to-wireless device association between the driver of the vehicle and the wireless device.

12. The computer program product of claim 7, further comprising
    computing a first confidence level associated with a first metric identifying the location of the wireless device;
    computing a second confidence level associated with a second metric identifying the location of the wireless device; and
    determining the location of the wireless device based at least in part on the first confidence level and the second confidence level.

13. A computing system including a processor and a memory configured to perform operations comprising:
    receiving data from one or more vehicle sensors of a vehicle, wherein the one or more vehicle sensors comprise at least one of a seat weight sensor, a microphone, and a vehicular-mounted camera;
    receiving data from one or more wireless device sensors of a wireless device;
    determining a presence of one or more persons in a vehicle, wherein determining the presence of the one or more persons further comprises determining an identity of the driver using one or more images captured by the camera, audio captured by the microphone, or information captured by the seat weight sensor;
    determining a location of the wireless device in the vehicle; and
    determining the usage of the wireless device by a driver of the vehicle using the identified presence of the one or more persons in the vehicle and the identified location of the wireless device in the vehicle.

14. The computer system of claim 13, further comprising establishing a secured association between the vehicle and the wireless device.

15. The computer system of claim 14, wherein identifying the presence of the one or more persons in the vehicle comprises receiving data from one or more vehicle sensors over the secured association between the vehicle and the wireless device.

16. The computer system of claim 13, further comprising
    computing a first confidence level associated with a first metric identifying the location of the wireless device;
    computing a second confidence level associated with a second metric identifying the location of the wireless device; and
    determining the location of the wireless device based at least in part on the first confidence level and the second confidence level.

17. The computer system of claim 13, wherein detecting the location of the wireless device in the vehicle further comprises using at least one of Wi-Fi, Bluetooth, acoustic signals with signal strength, time of flight, or time difference of arrival.

18. The computer system of claim 13, wherein identifying the presence of the one or more persons in the vehicle further comprises applying facial recognition to one or more images received from one of a camera of the wireless device and a vehicular-mounted camera of the vehicle.

19. The computer system of claim 13, further comprising enabling a driver-friendly interface on the wireless device.

* * * * *